United States Statutory Invention Registration [19]

[11] Reg. Number: H584

Schwering et al. [43] Published: Feb. 7, 1989

[54] DIELECTRIC OMNI-DIRECTIONAL ANTENNAS

[75] Inventors: Felix Schwering, Eatontown, N.J.; Song-Tsuen Peng, Dix Hills, N.Y.

[73] Assignee: The United States of America as represented by the Secretary of the Army, Washington, D.C.

[21] Appl. No.: 943,229

[22] Filed: Dec. 18, 1986

[51] Int. Cl.[4] ..... H01Q 13/00
[52] U.S. Cl. ..... 343/785
[58] Field of Search ..... 343/785

[56] References Cited

U.S. PATENT DOCUMENTS

| | | | |
|---|---|---|---|
| 2,433,924 | 1/1948 | Riblet | 343/785 |
| 3,216,017 | 11/1965 | Moore | 343/785 |
| 4,468,672 | 8/1984 | Dragone | 343/785 |
| 4,673,945 | 6/1987 | Syrigos | 343/785 |
| 4,689,629 | 8/1987 | Traut et al. | 343/785 |

FOREIGN PATENT DOCUMENTS

| | | | |
|---|---|---|---|
| 1910995 | 9/1970 | Fed. Rep. of Germany | 343/785 |
| 1917675 | 10/1970 | Fed. Rep. of Germany | 343/785 |
| 2648375 | 4/1978 | Fed. Rep. of Germany | 343/785 |
| 0240044 | 1/1970 | U.S.S.R. | 343/785 |
| 0688374 | 3/1953 | United Kingdom | 343/785 |
| 0801835 | 9/1958 | United Kingdom | 343/785 |

OTHER PUBLICATIONS

"A Millimeter-Wave Receiving Antenna with an Omni-Directional or Directional Scannable Azimuth Pattern and a Directional Vertical Pattern," IEEE Trans. Antennas and Preparation, 7/72, Ore, F. R.

Schwering, F. K., Peng, S., "Design of Dielectric Grating Antennas for Millimeter-Wave Applications," IEEE Trans. on Microwave Theory and Technique, vol. MTT-31, No. 2, 2/83.

*Primary Examiner*—Stephen C. Buczinski
*Assistant Examiner*—Linda J. Wallace
*Attorney, Agent, or Firm*—Sheldon Kanars; John K. Mullarney

[57] ABSTRACT

A circular symmetrical dielectric antenna structure and feed arrangement provide an omni-directional radiation pattern. The antenna includes a linear dielectric feed section, an integral radiating section having a taper which decreases outwardly, and an excitation means coupling millimeter wave energy to the feed section. The entire structure is circularly symmetrical about a central longitudinal axis. A first embodiment is in the form of a longitudinal dielectric rod having a uniform diameter at the feed and with circular periodically spaced corrugations at the radiating end. A tapered intermediate section has grooves of increasing depth, with the depth being constant at the remainder of the radiating end. A circular waveguide couples energy to a tapered dielectric transition section to provide excitation to the uniform feed end. A second embodiment is in the form of a flat circular disk having tapered radiating ends. A central metal cap limits radiation from the top surface. Excitation is provided by a circular metal waveguide coupled to a tapered dielectric transition section, a coaxial cable connected along the central axis, or a rectangular to circular metal waveguide coupling.

5 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIELECTRIC OMNI-DIRECTIONAL ANTENNAS

The Government has rights in this invention pursuant to Contract Number DAAK80-79-C-0798 awarded by the Department of the Army.

BACKGROUND OF THE INVENTION

1. Field of the Invention

The present invention relates to dielectric antennas and particularly to a solid dielectric antenna which provides an omni-directional radiation pattern.

2. Description of the Prior Art

Recent developments in millimeter wave systems using integrated circuit technology have included new dielectric waveguides which can be made to have lower losses than metallic types so that the size, weight and cost of such systems can be greatly reduced. Dielectric antenna structures have also been investigated to match the dielectric waveguides. Examples of such structures are found in a paper entitled "Design of Dielectric Grating Antennas for Millimeter-Wave Applications" published in the IEEE Transactions on Microwave Theory and Techniques, Vol. MTT-31, No. 2, February 1983, authored by the present inventors. These rectangular longitudinal corrugated dielectric antennas have provided highly directive small beamwidth radiation patterns. Transitions between antenna and waveguide sections have been made gradual by tapering the depth of corrugations, and tapering the radiating rod end has been used to increase the gain of a dielectric end-fire antenna.

There is a need, however, for dielectric antennas which are omni-directional and provide a circular symmetrical radiation pattern for use in such applications as ground radio communications between moving vehicles and for short range secure communications. A previous related antenna having circumferential grooves on a rod extending from a waveguide is described in another paper entitled "A Millimeter Wave Receiving Antenna with an Omnidirectional or Directional Scannable Azimuth Pattern and a Directional Vertical Pattern" in the IEEE Transactions on Antennas and Propagation, July 1972, by Fred R. Ore. This device, however, had undesired reflections and losses, did not have a tapered radiating section of at least one wavelength long to reduce these effects and required a conductive coating.

SUMMARY OF THE INVENTION

It is therefore the primary object of the present invention to provide a dielectric antenna having an omni-directional radiation pattern for use in millimeter wave applications.

A further object of the invention is to provide an omni-directional dielectric antenna having a circular symmetrical configuration of simple construction.

An additional object of the invention is to provide a circular symmetrical dielectric rod antenna having an end radiating section with a plurality of circular corrugations, including an intermediate tapered portion of at least one wavelength, which produce an omni-directional radiation pattern.

Another object of the invention is to provide a circular symmetrical dielectric antenna having a tapered feed section which matches the antenna to the waveguide feed section and reduces undesired reflections and losses.

It is also an object of the invention to provide a circular symmetrical dielectric antenna having a disk shape with tapered ends to radiate in an omni-directional pattern.

These objects are achieved with an antenna structure including a linear dielectric waveguide feed section, an integral radiating section extending from the feed section and including a tapered region having a dimension which decreases outwardly from the feed section and extends for at least one wavelength. The feed and radiating sections are circularly symmetrical about a central longitudinal axis, and excitation means couples high frequency energy to the feed section in a circularly symmetrical mode to provide a broadside omni-directional radiation pattern. In one form, the antenna is in the shape of a uniform cylindrical rod at the feed end with circular periodically spaced corrugations at the radiating end and a tapered intermediate section with grooves of increasing depth. A second embodiment is in the form of a flat circular disk having tapered radiating ends and includes a central metal cap to limit radiation from the top side. The excitation means may be in the form of a circular metal waveguide coupled to a tapered dielectric transition section, or a coaxial line. Other objects and advantages will become apparent from the following description in conjunction with the accompanying drawings.

DESCRIPTION OF THE PREFERRED EMBODIMENTS

Figure 1:
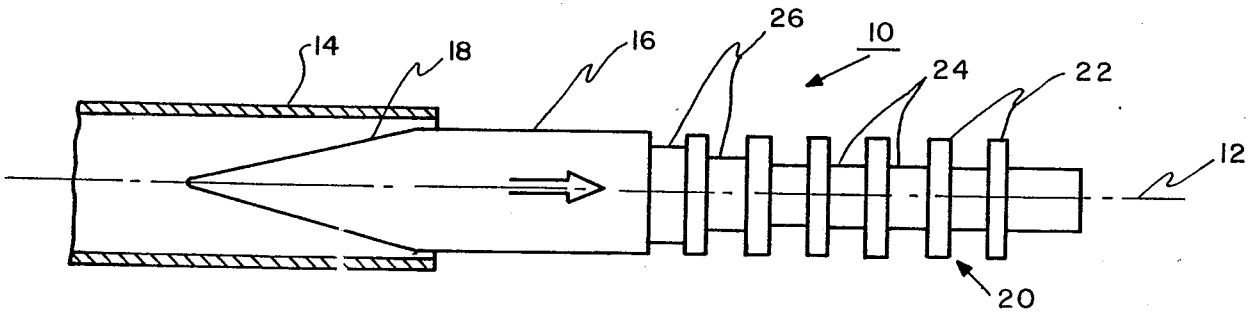
FIG. 1 is side view in partial cross-section of a circular dielectric rod antenna with periodic corrugations and a waveguide feed.
Figure 2:
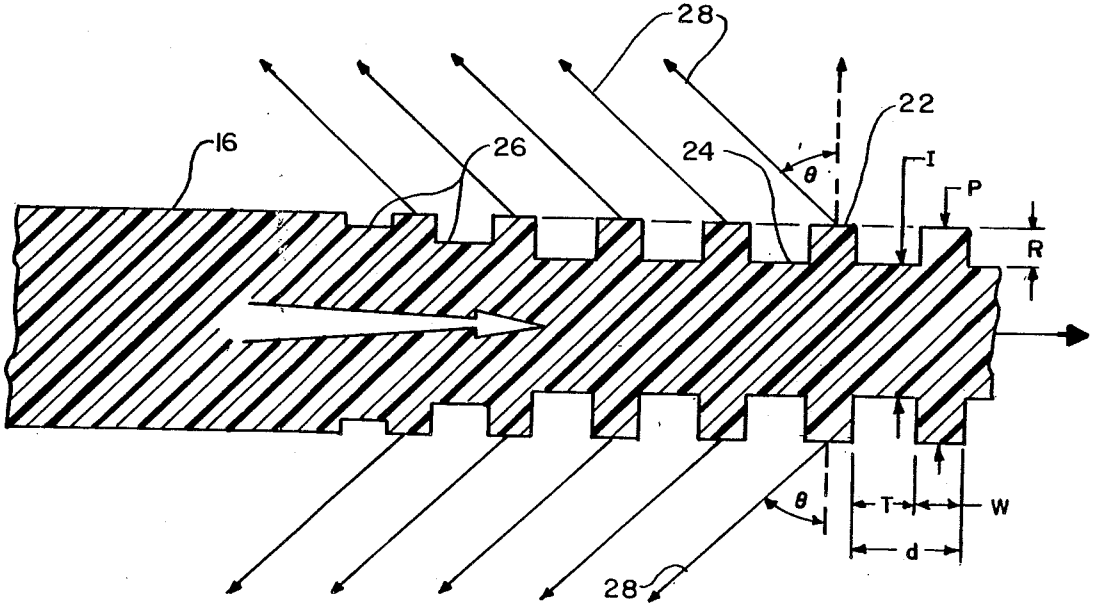
FIG. 2 is a cross-sectional side view of the corrugated rod antenna.

As shown in FIG. 1, a periodic corrugated dielectric rod antenna 10 is circularly symmetrical about the central longitudinal axis 12. High frequency energy in the millimeter wave range of from 30–300 GHz is fed from a suitable source, such as a transmitter, to a circularly symmetrical metal waveguide section 14 which is coupled to a dielectric waveguide feed section 16 through a tapered dielectric section 18 providing a gradual transition from the metal waveguide to the dielectric waveguide. Feed section 16 has a constant uniform outer diameter for guiding the energy to the main radiator section 20 which has the periodic corrugations 22 and grooves 24. A tapered corrugated intermediate section 26 includes grooves which gradually increase in depth to reduce undesired scattering losses and reflections and provide a match between the waveguide feed and antenna radiator sections. The corrugations are of uniform outer diameter equal to the feed section diameter while the inner groove diameter is uniform in the radiatrr end section 20 following the tapered section 26. As shown in FIG. 2, the end corrugations 22 have a period or spacing d, diameter P and width W, and the grooves 24 have a width T, diameter I, and depth R. The length of the tapered section 26, which should be at least one wavelength long, and the groove depth may be varied for best matching and reduced losses and may also serve to shape the radiating pattern. The preferred dielectric materials have a high dielectric constant for millimeter wave applications and include silicon, aluminum oxide, gallium arsenide and the like. Typical dimensions for the periodic corrugated antenna might be 5 to 10 centimeters in length and less than one half centimeter in diameter for the operating frequencies in the millimeter range of 30 to 300 GHz, with each groove spaced about 0.3–0.5 wavelength apart depending upon the dielectric constant of the antenna material.

While energy may be radiated into both substrate and air regions in prior rectangular dielectric grating type antennas, the present dielectric cylindrical rod corrugated antenna radiates only into the air region, as shown by arrows 28 in FIG. 2. Thus there is no need for shaping the groove profile to minimize undesired radiation into the substrate. The amount of radiation in the air depends primarily on the groove depth, so that a simple groove geometry can be chosen for convenient fabrication and production.

Excitation at the feed end of the antenna may be by a circular metal waveguide as illustrated, or by a coaxial cable, or dielectric waveguide. For omni-directional radiation, the antenna will be excited in the circular symmetric $TE_{01}$ or $TM_{01}$ mode of the uniform diameter feed section. For $TE_{01}$ excitation, the radiation pattern of the antenna will be horizontally polarized and in the case of $TM_{01}$ excitation, the pattern will be vertically polarized. As an alternative, the feed section may be excited in the fundamental $HE_{11}$ mode. In order to obtain an omni-directional radiation pattern, the $HE_{11}$ mode must be circularly polarized. The radiation pattern in this case will be elliptically polarized. The type of radiation field created about the antenna by the circular symmetric excitation modes would be generally cone shaped. In the planes perpendicular to the antenna's central axis, the radiation will be omni-directional with equal magnitude along all radii leading away from the antenna. In the planes containing the central axis, on the other hand, there is directivity to the main beam of the cone-shaped pattern. By proper choice of parameters, as will be explained, the beam can be made wider or narrower and can be made to propagate in the forward or backward directions.

Before discussing antenna parameters which influence the radiation pattern, the antenna operation will be described. As a solid rod without any grooves or pertubations, the antenna would be only a normal dielectric waveguide which would radiate little or no energy so that all energy would simply pass through the rod and possibly be reflected at the termination. The pertubations in the rod however permit antenna action to be obtained. Radiation becomes stronger as the grooves are made increasingly deeper. It should also be noted that it would be possible to create substantially the same effect as grooves by utilizing a ribbon-like material wrapped around a solid rod in a spiral pattern to create areas along the rod of greater and smaller thickness. The ribbon could be of the same material as the rod and could have some other periodic arrangement. In an alternate antenna configuration, the corrugations may be in the form of metal rings on the dielectric rod. It is believed that metal rings would produce even stronger radiation than would dielectric corrugations but would increase the complexity and cost. Another parameter to be considered is the dielectric constant of the rod material which is not as critical to the radiation pattern as the other parameters. However, for higher dielectric constant material, a thinner rod would be needed, with other factors being equal, and for material of lower dielectric constant, the rod would have to be widened to establish the same sized and shaped pattern. The periodicity of the grooves, d, and the frequency of the excitation (wavelength $\lambda$) determine the operative angle of the cone shaped radiation pattern.

The basic principle of the dielectric rod antenna may be explained by regarding the corrugations as a perturbation of the uniform waveguide which causes scattering or a leakage of energy from the original guided wave. Such scattering may result in the radiation of energy into the surrounding space, depending on the relative values of the guide wavelength and the period of the radiating structure. The guide wavelength depends upon the frequency of excitation, the relative dielectric constant of the rod, and its dimensions, and can be normalized to the free space wavelength. The frequency of the excitation can be regarded as an implicit parameter that affects the radiation of energy from a guided wave into the surrounding space. Other factors include the relative dielectric constant, the inner and outer radii of the periodic corrugations, I and P, and also the period, d.

When radiation or leakage of energy occurs, a mode of the periodic waveguide must decay exponentially as it propagates along the waveguide. This leaky mode is characterized by a complex propagation constant including a propagation wavenumber and a decaying or attenuation constant which can be written in the form: $K=\beta-i\alpha$, where $\beta$ is the phase constant or wavenumber of the fundamental space harmonic and $\alpha$ is the attenuation or radiation constant which has a positive value for the assumed time dependence of exponential $(+iwt)$.

The field distribution of the antenna can be written as a superposition of space harmonics whose complex propagation constants are related to that of the fundamental harmonic by:

$$K_n = K + \frac{2\pi n}{d} = \left(\beta + \frac{2\pi n}{d}\right) - i\alpha$$

$$\text{for } n = 0, \pm 1, \pm 2, \ldots$$

where d is the period of the surface corrugation.

In general, there is only a finite number of space harmonics of the propagating or radiating type, while the remaining space harmonics are reactive, in that they decay exponentially in the radial direction away from the antenna. A propagating space harmonic results in radiation at an angle given by:

$$\theta_n = \arcsin\left(\frac{\beta}{K_o} + \frac{2\pi n}{K_{od}}\right) = \arcsin\left(\frac{\lambda_o}{\lambda_g} + n\frac{\lambda_o}{d}\right)$$

where $$K_o = \frac{2\pi}{\lambda_o}$$

is the freespace wave number, $\lambda_O$ is the freespace wavelength, and $\lambda_g$ is the guide wavelength in the z-direction. $\theta_n$ is measured from the azimuth plane z=0. The beam radiated by each propagating space harmonic will have a conical shape centered about the antenna axis. The aperture angle of this cone is given by $90° - \theta_n$ and thus varies from space harmonic to space harmonic so that, in general, the antenna will radiate several beams simultaneously.

For most omni-directional antenna applications it is desirable to concentrate the radiation in one conical pattern only. This can be achieved by appropriate choice of the surface period, d, such that only one space harmonic (usually that of order n=−1) is of the propagating type. With the above equation the radiation angle of the antenna is then given by:

$$\theta_{rad} = \theta_{-1} = \arcsin\left(\frac{\lambda_o}{\lambda_g} - \frac{\lambda_o}{d}\right)$$

The sign of $\theta_{rad}$ may be either positive or negative, depending on the relative values of d, $\lambda_g$ and $\lambda_0$. If $\theta_{rad}>0$, the radiation is in the forward direction, and if $\theta_{rad}>0$, the radiation is in the backward direction. Although the radiation vanishes exactly in the broadside direction, $\theta_{rad}=0$, it is fortunate that low radiation levels occur only within a small angle (±3 degrees) with respect to the broadside direction. Therefore, an antenna will be able to radiate in a direction very close to broadside and at a sufficiently high level. A minor correction can then be made to achieve true broadside radiation for the omni-directional antenna application. Expectedly, the dielectric rod antenna will require a radome cover for protection. With proper design, the radome may also serve as a prism that provides the required minor correction of the radiating direction. Thus, the drawback of slight broadside blindness of this periodic rod antenna can be readily overcome with little additional cost.

Figure 3:
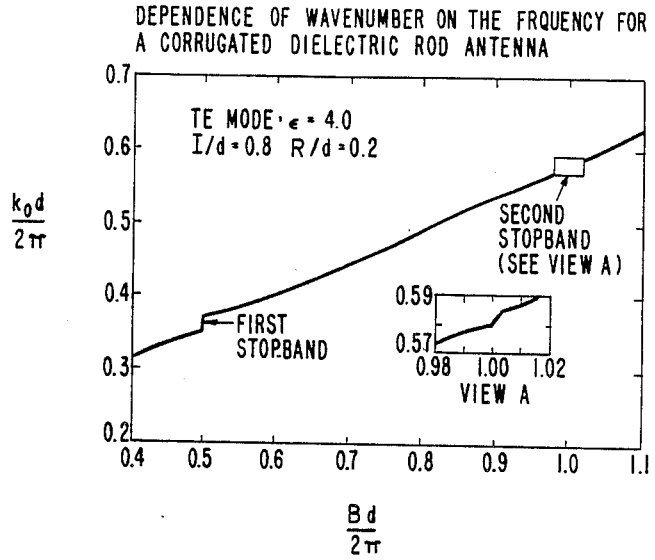
FIG. 3 is a graph showing the variation of wavenumber with frequency for the rod antenna.
Figure 4:
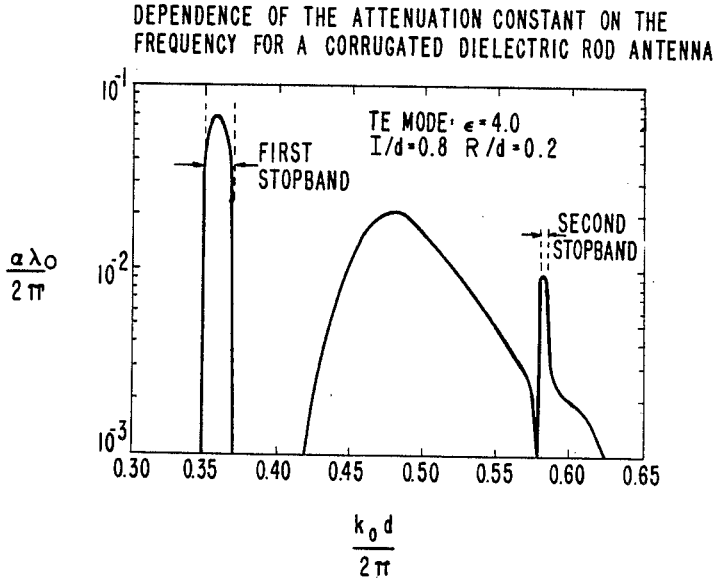
FIG. 4 is a graph showing the variation of attenuation constant with frequency for the rod antenna.

The frequency response of such periodic dielectric antennas, including the variation of phase constant or wavenumber versus frequency and of attenuation constant versus frequency is illustrated in FIGS. 3 and 4 in terms of the Brillouin diagrams for excitation in the fundamental $TE_{01}$ mode. The curves for $\beta$ and $\alpha$ indicate a first stopband in the bounded wave region and a second stopband in the leaky-wave region. The variation of attenuation constant in its first stopband is due to Bragg reflections only and no radiation occurs. The second stopband is due to contributions from both Bragg reflection and radiation. This stopband occurs over a very short frequency range, and is not considered very useful for antenna applications as the reflection of energy is considered too large to be tolerable.

The useful frequency band is the intermediate range between the first and second stopbands. In this range attenuation is caused by radiation alone. At the frequency where $\alpha$ reaches a peak value in this range (see FIG. 4), the radiation of the antenna is at a maximum and the axial length of the periodic rod required to obtain high antenna efficiency is at a minimum.

With the complex propagation constant known, calculation of directivity gain and radiation pattern of periodic antennas is straight forward. Numerical evaluations have shown that the side lobe level of these antennas depends strongly on their efficiency, i.e., on the percentage of the input power which is actually radiated rather than absorbed at the antenna termination.

Figure 5A:
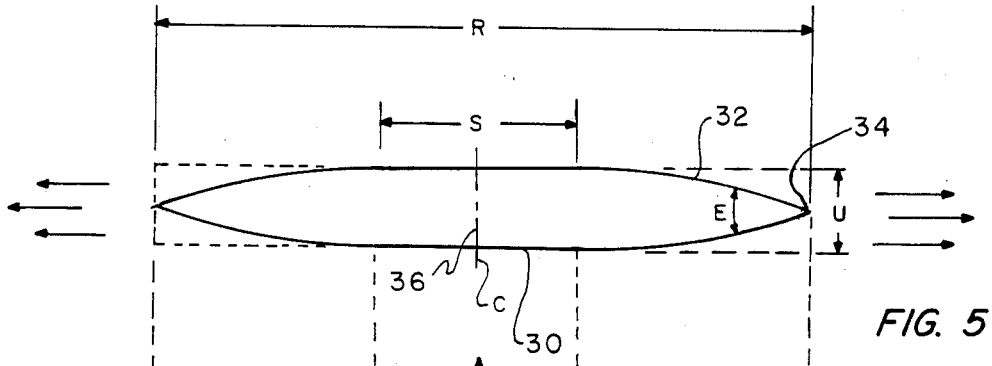
FIGS. 5*a* and 5*b* show side and top views of a circular dielectric disk antenna with tapered ends.
Figure 5B:
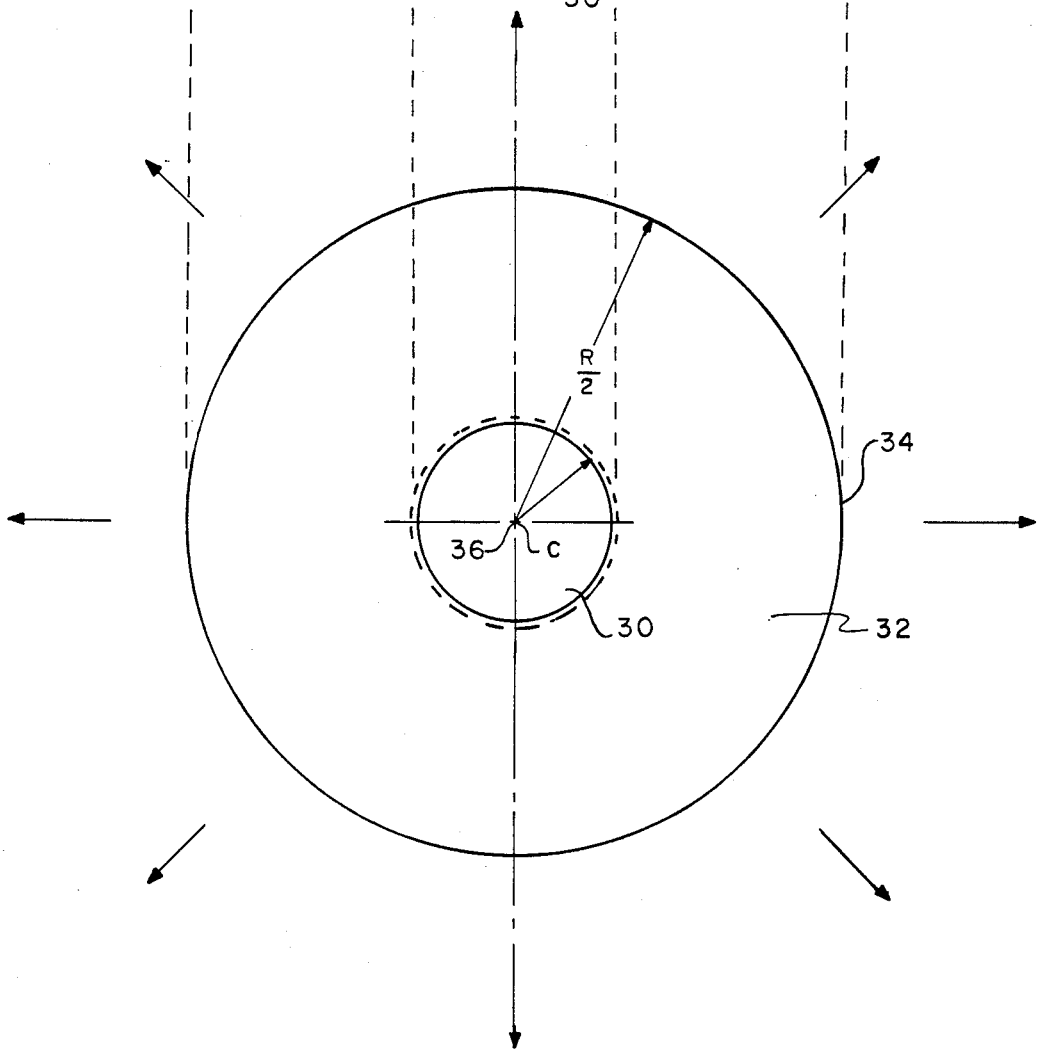

Dielectric rods have also been used as end-fire antennas where the gain of the antenna may be greatly increased by tapering the rod ends. As an extension of this principle, a high performance omni-directional antenna of dielectric material may be made of a tapered circular symmetrical dielectric disk. Such a structure, as shown in FIGS. 5*a* and 5*b*, includes two sections extending transversely about the central axis. One is a circular central feed section 30 of diameter S and uniform thickness U. The other is a tapered radiation section 32 with thickness gradually decreasing outwardly to the periphery or end 34 at the outer diameter R. For use as an omni-directional antenna, the disk may be excited at the center 36 by suitable means such as a coaxial cable operating in the fundamental TEM mode.

In the case of an untapered circular disk, if a cylindrical surface wave is excited at the center it will propagate radially outward, with the surface wave mode being guided by the structure. Scattering of such a surface wave will occur at the termination, at diameter R, resulting in the reflection of energy back into the dielectric and transmission or radiation of energy into free space. The scattering by such an abrupt termination causes a large reflection and high unwanted side lobes of the radiated field. The reflection phenomenon is greatly reduced by tapering the termination in order to produce a smooth transition. Furthermore, the tapering will also reduce unwanted side-lobes and sharpen the main beam, so that a taper antenna will have high directivity in the elevation plane. Since the excitation and the structure are both independent of the azimuthal angle, the radiation pattern in the horizontal plane is uniform in magnitude and phase. Hence an omni-directional antenna is obtained which is very simple in construction, as will be described further.

Figure 8:
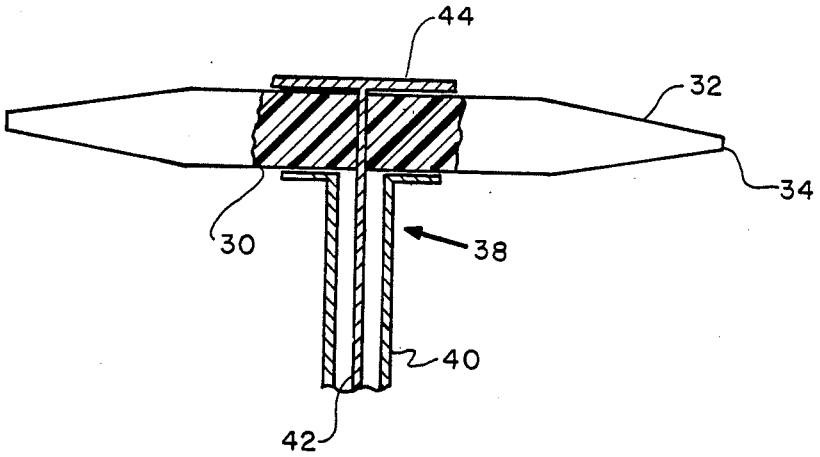
FIG. 8 is a side view in partial cross-section of a tapered disk antenna with a coaxial line feed.

In the following discussion it should be understood that specific values and the particular arrangements are merely exemplary and that other values, sizes, modes, frequencies, materials, and the like, may be used. Typical overall dimensions for the circular disk antenna would be 5 centimeters as the overall diameter, with somewhat less than 0.5 centimeters in thickness U. The angle E of the taper is typically less than fifteen degrees, and typical operating frequencies are in the millimeter wave region of 30–300 GHZ. The length of the tapered section should be at least one wavelength long for proper operation. As shown in FIG. 8, the antenna may be excited at its center along the central axis from one side by a circularly symmetrical coaxial feed line, 38, operating in the TEM mode. The outer conductor 40 is secured to the lower side of the uniform feed section 30 and the inner conductor 42 to a metal cap or screen 44 at the opposite upper surface of section 30. The cap is used to prevent energy from radiating vertically directly through the central section and to retain energy for radiation laterally through the tapered end.

The tapering may take any suitable shape as seen from a side view. The taper may decrease in thickness to the outer edge in any continuous monotonic manner. For example, the decrease may follow an elliptical, parabolic, or straight line relation. The outer edge also need not come to a point, but may be rounded to have some thickness or a blunt edge. The radiation pattern which emanates from the disk is omni-directional in the azimuthal plane, which is in the plane of the disk. In the elevation plane, which contains the antenna axis, there is a mainlobe in the direction of the edge of the antenna disk. In three dimensions, the pattern is circularly symmetric about the central longitudinal disk axis with a maximum in the plane of the disk. The main beam becomes wider if the diameter of the disk is reduced and narrower if the diameter is increased such that the taper of the disk is more gradual.

In analyzing this structure for its guidance and radiation characteristics, it is helpful to use a staircase approximation for describing the elements, including the uniform core and the tapered section, enclosed in a parallel plate metallic waveguide, where the plate separation is chosen sufficiently large so that the presence of the metal waveguide will not perturb the surface wave appreciably. This procedure is made possible because the structure is excited by surface waves which are mainly confined to the dielectric body. When a staircase approximation is introduced, each step has constant thickness and a complete set of mode functions for each subregion can be easily determined. By matching the tangential field components at the step discontinuities between the uniform subregions, the mode amplitudes in the subregions are related by a set of linear simultaneous equations which can be solved by well known mathematical techniques. Thus, the surface-wave scattering by a tapered structure can be considered as a boundary value problem that has known solutions. For omni-directional antenna applications, only the pure TE and pure TM modes which are angularly independent are used.

Figure 6:
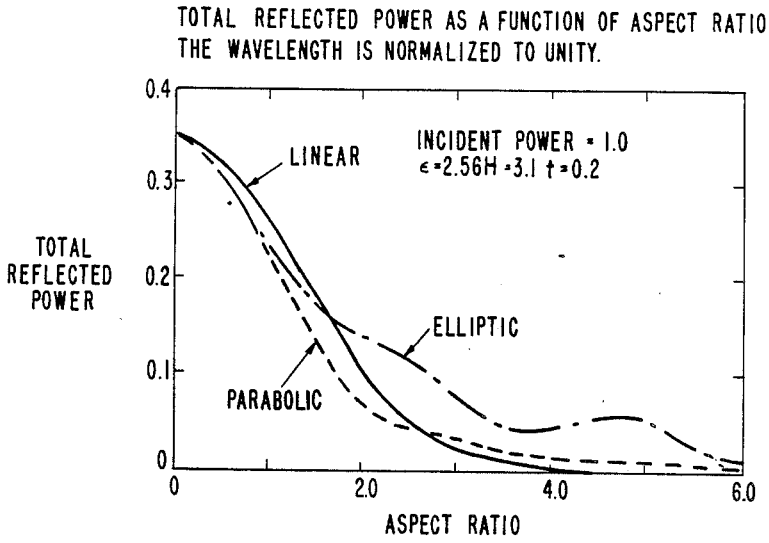
FIG. 6 is a graph of total reflected power as a function of aspect ratio for a tapered dielectric circular disk antenna of linear, elliptic and parabolic taper profile.
Figure 7:
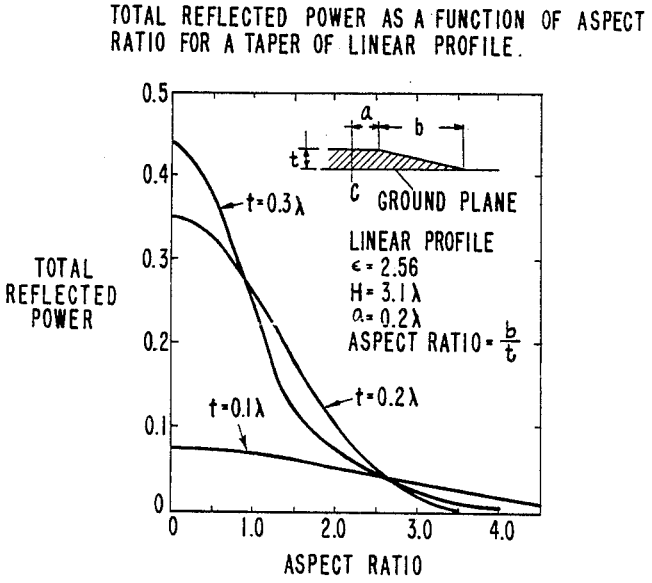
FIG. 7 is a graph of total reflected power as a function of aspect ratio for a linear tapered disk antenna with various thicknesses.

Of special interest are the directivity gain and radiation patterns of these disk antennas and the dependence of these quantities on taper profile. An important factor affecting gain is the reflection of energy at the input end of the taper. In FIG. 6, the total reflected power at the input end as a function of the aspect ratio of the taper is shown for linear, parabolic and elliptical taper profiles. The behavior of these curves may be explained as follows: for a short taper (small aspect ratio), the linear profile has the largest discontinuity at the input end, therefore it results in the largest reflected power among the three profiles under consideration. On the other hand, for a long taper, the effect of the discontinuity at the input end becomes negligible and most of the guided energy will travel to the tip of the taper. At the tip, the linear profile has the smallest discontinuity and the reflection from the tip section is the smallest. In FIG. 7, similar curves are shown for a linear taper profile with three different heights t, at the base. It is observed from these curves that for an antenna with a large aspect ratio (very gradual taper), the reflection coefficient is small even if t is large, while in the case of a short taper, a small reflection coefficient requires a small t. This is due to the fact that for an antenna of large height, e.g. $t=0.3\lambda$, the surface wave energy is concentrated more in the dielectric material and the scattering of the surface wave is affected greatly by the aspect ratio. On the other hand, at a low height, ($t=0.1\lambda$), a substantial portion of the surface wave energy travels in the air region and the scattering of the surface-wave should be insensitive to the aspect ratio of the taper. The dimension $2t$ in FIG. 7 is equal to the dimension U in FIG. 5, $2a=S$, $2b=R-S$, and H is the height of the assumed parallel plate metal waveguide.

Figure 9:
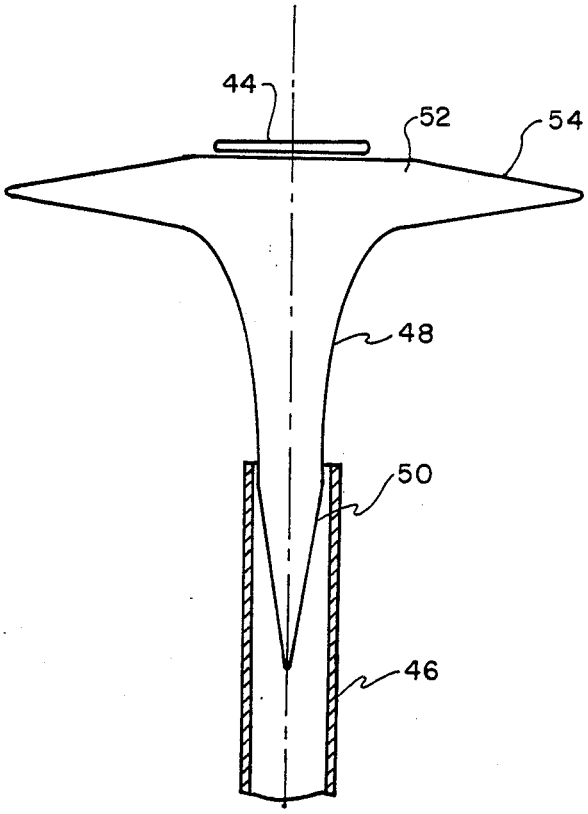
FIG. 9 is a side view in partial cross-section of an alternative tapered disk antenna with a circular waveguide feed.

FIG. 9 shows a variation of the dielectric disk antenna fed by a circular metal waveguide 46 which is coupled to a longitudinal dielectric feed section 48 along the central axis through a tapered dielectric transition section 50. The metal cap 44 at the upper side of the uniform central section 52 of the antenna disk serves to prevent vertical radiation along the axis and retain the energy for radiation from the tapered end 54. Feed section 48 flares gradually into the central section 52 to avoid undesired reflections.

Excitation may be in the $TM_{01}$ or $TE_{01}$ modes . The $TM_{01}$ mode will result in a vertically polarized radiation pattern while $TE_{01}$ excitation will provide a horizontally polarized radiation pattern. A dielectric waveguide feed excited in the fundamental $HE_{11}$ mode at circular polarization providing an elliptically polarized radiation field may also be employed.

Figure 10:
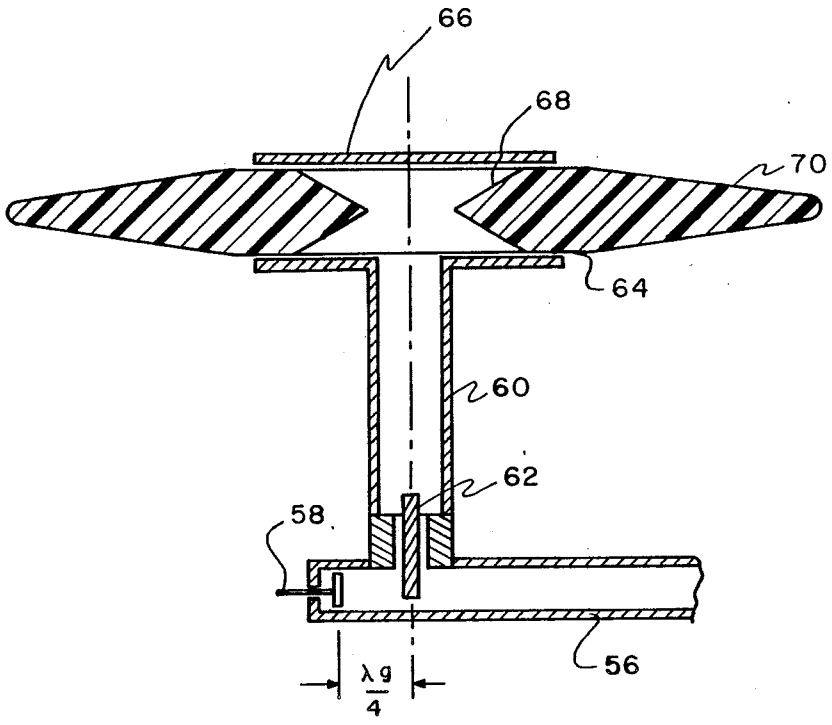
FIG. 10 is a side view in cross-section of a further tapered disk antenna having a circular metal waveguide feed and a rectangular waveguide input line.

A further version of the dielectric disk antenna, shown in FIG. 10, employs a rectangular metal waveguide 56 which is joined to an axial circular metal waveguide feed section 60 operating in the $TM_{01}$ mode. The coaxial junction between the rectangular and circular waveguides includes coupling means 62 which insures $TM_{01}$ mode excitation of the latter waveguide. The adjustable short 58 at a distance of one quarter wavelength from the end minimizes coupling loss between the two waveguides. The flange at the upper end of waveguide 60 is mounted against the lower side of the uniform central section 64 of the dielectric disk, with a metal cap 66 at the upper side. A tapered central inner transition section 68 in an open area between the metal cap and waveguide end serves to reduce reflections and improves radiation from the tapered end 70.

While the invention has been described with respect to specific embodiments, it should be understood that other variations may be made in the particular designs and configurations without departing from the scope of the invention as set forth in the appended claims.

What is claimed is:

1. An antenna comprising:

a solid dielectric cylindrical feed section having a uniform diameter;

a solid radiating section extending from and integral with said feed section and including a cylindrical tapered region whose diameter decreases outwardly from said feed section and extends for at least one wavelength, said radiating section including a plurality of periodically spaced corrugations having grooves therebetween, said corrugations being between 0.4 and 0.6 wavelengths apart and said grooves having gradually increasing depths in an intermediate length of said radiating section and having a constant depth in the end region of said radiating section.

2. The device of claim 1 further including a circular metal waveguide surrounding said feed section.

3. The device of claim 1 wherein said feed section includes a tapered transition section extending within said waveguide and receiving energy therefrom.

4. The device of claim 1 wherein said corrugations are rings having a uniform outer diameter.

5. The device of claim 4 wherein said rings are metal.

* * * * * *